United States Patent Office 3,024,291
Patented Mar. 6, 1962

3,024,291
METHOD OF MAKING ALPHA-HALOETHYL VINYLBENZENES
George A. Olah and Stephen J. Kuhn, Sarnia, Ontario, Canada, assignors to The Dow Chemical Company, Midland, Mich., a corporation of Delaware
No Drawing. Filed Aug. 24, 1960, Ser. No. 51,528
3 Claims. (Cl. 260—651)

This invention concerns a method for making alpha-haloethyl vinylbenzenes. It relates more particularly to a method for carrying out the selective addition of a hydrohalic acid to divinylbenzenes to produce the corresponding alpha-haloethyl vinylbenzenes.

It is known to prepare di-(alpha-chloroethyl)-benzenes by passing hydrogen chloride into a mixture of a concentrated aqueous hydrochloric acid solution and a liquid hydrocarbon material comprising para-divinylbenzene at temperatures between 0° and 30° C.

It has now been discovered that alpha-haloethyl vinylbenzenes can readily be prepared by passing a hydrohalic acid such as hydrogen chloride or hydrogen bromide into a liquid hydrocarbon material comprising meta-divinylbenzene and at least one of its isomers, preferably a mixture of meta- and para-divinylbenzenes, while maintaining the mixture at reaction temperatures between −20° and −80° C.

It has been found that at reaction temperatures of −20° C. and below, the hydrogen halide reacts selectively with a single vinyl group of the divinylbenzene to produce a corresponding alpha-haloethyl vinylbenzene in quantitative or substantially quantitative yield, with little, if any, formation of the di(alpha-haloethyl)benzene addition products, even when adding substantially greater than stoichiometric quantities of the hydrogen halide.

It is important that the reaction be carried out at temperatures of −20° C. or below in order to obtain selective addition of the hydrogen halide to a single vinyl group and produce the alpha-haloethyl vinylbenzene product.

The divinylbenzenes to be employed as starting materials can be ortho-, meta- or para-divinylbenzene or a mixture of any two or more of the isomeric compounds and may be in pure or substantially pure form or as a divinylbenzene fraction such as is available commercially and which fraction may consist of from about 25 to 55 percent by weight or more of one or a mixture of the isomeric divinylbenzenes, e.g. a mixture of meta- and para-divinylbenzenes, together with about 75 to 45 percent by weight of ethylvinylbenzenes. In general, the commercially available divinylbenzene fractions are prepared by dehydrogenation of diethylbenzenes in the presence of a catalyst. The divinylbenzene product is recovered by distillation as a fraction or cut containing the divinylbenzenes in proportions which range from about 25 to 55 percent by weight in admixture with ethylvinylbenzenes and diethylbenzenes. The preferred starting material is a liquid aromatic hydrocarbon material containing a mixture of the isomeric meta- and para-divinylbenzenes together with a mixture of corresponding meta- and para-ethylvinylbenzenes and small amounts of corresponding meta- and para-diethylbenzenes.

The hydrohalic acids to be employed can be hydrogen chloride or hydrogen bromide. They are usually employed in amounts chemically equivalent to the sum of the ethylvinylbenzenes and one-half of the divinylbenzenes in the liquid hydrocarbon starting material in order that the divinylbenzenes be substantially all converted to the corresponding alpha-haloethyl vinylbenzenes in the reaction. The hydrogen halide can be employed in greater proportions under the reaction conditions herein defined, e.g. in amounts up to ten chemical equivalents or more of the divinylbenzene to produce a corresponding alpha-haloethyl vinylbenzene in quantitative or substantially quantitative yield, with little, if any, formation of the di(alpha-haloethyl)benzene addition product, even when adding substantially greater than stoichiometric quantities of the hydrogen halide.

The reaction can be carried out at atmospheric, subatmospheric or superatmospheric pressure, but is conveniently and advantageously carried out at atmospheric or substantially atmospheric pressure and at temperatures between −20° C. and −80° C.

The reaction is preferably carried out under anhydrous or substantially anhydrous conditions, and may be carried out in admixture with a liquid hydrocarbon solvent such as toluene, xylene, ethylbenzene, diethylbenzene, petroleum ether and the like.

In practice the divinylbenzene starting material is placed in a suitable reaction vessel and stirred and cooled to a temperature between −20° C. and −80° C. Thereafter, the hydrogen halide, e.g. hydrogen chloride or hydrogen bromide, is added suitably by bubbling the gaseous hydrogen halide into the liquid, while stirring the mixture, at about the rate it is consumed in the reaction in the desired amount. The excess or unreacted hydrogen halide is removed, suitably under reduced pressure, while maintaining the mixture at the reaction temperature to avoid the formation of di(alpha-haloethyl)benzene by-product.

The alpha-haloethyl vinylbenzene product can be used per se without separating it from the reaction mixture in which it is prepared, for example as an intermediate in the preparation of other chemical compounds, or it can be recovered in usual ways, e.g. by distillation, as the pure compound or as a fraction in admixture with the alpha-haloethylbenzenes. It may be mentioned that in the carrying out of the reaction of hydrogen chloride with a hydrocarbon material comprising a mixture of meta- and para-divinylbenzenes together with meta- and para-ethylbenzenes (a usual commercial divinylbenzene fraction), the product is usually separated as a fraction containing both alpha-chloroethyl vinylbenzene (B.P. 101–103° C. at 14 mm.) and alpha-chloroethyl ethylbenzene (B.P. 103–105° C. at 14 mm.) because of the closeness of the boiling points of the compounds.

The following examples illustrate ways in which the principle of the invention has been applied but is not to be construed as limiting its scope.

*Example 1*

In each of a series of experiments, a charge of 72.2 grams of a divinylbenzene fraction consisting of 90 percent by weight of a mixture of approximately 65 percent meta-divinylbenzene and 35 percent para-divinylbenzene, 7 percent by weight of a mixture of 65 percent meta-ethylvinylbenzene and 35 percent para-ethylvinylbenzene and 3 percent by weight of a mixture of 65 percent meta-diethylbenzene and 35 percent para-diethylbenzene was placed in a glass reaction vessel. The mixture was stirred and was cooled to a temperature as stated in the following table. Thereafter, hydrogen chloride or hydrogen bromide, as stated in the table was added to the liquid in amount as stated in the table while maintaining the temperature of the mixture at the stated value. After addition of the stated amount of the hydrogen halide, the mixture was stirred for one hour longer at the stated temperature. Thereafter, the unreacted hydrogen halide was removed from the cold mixture by vaporizing it and evacuating the vapors. The residue was washed with ice water and was separated and dried. The product was analyzed to determine the proportion of vinyl groups in the product, employing procedure similar to that described in Anal. Chem., vol. 21, page 1194 (1949). Table I identifies the experiments and gives the proportions of divinylbenzene and ethylvinylbenzene and hydrogen halide employed, expressed as gram molecular proportions employed in the experiments and gives the reaction temperature. The table also identifies the product as being the mono- or di-addition compound and gives the proportion obtained, expressed as gram moles. For purposes of comparison, experiments were carried out at reaction temperatures outside the scope of the invention and are included in the table.

TABLE I

| Run No. | Starting materials | | | | Reaction conditions | | Product | | |
|---|---|---|---|---|---|---|---|---|---|
| | Divinyl-benzene, mol. | Ethyl vinyl benzene, mol. | Hydrogen halide | | Temp., °C. | Time, hrs. | α-Haloethyl vinyl benzene, mol. | Di(α-halo-ethyl)-benzene, mol. | α-Haloethyl ethylbenzene, mol. |
| | | | Kind | Mol. | | | | | |
| 1 | 0.5 | 0.12 | HBr | 0.62 | −80 | 1 | 0.5 | 0 | 0.12 |
| 2 | 0.5 | 0.12 | HBr | 0.62 | −50 | 1 | 0.5 | 0 | 0.12 |
| 3 | 0.5 | 0.12 | HBr | 0.62 | −30 | 1 | 0.5 | 0 | 0.12 |
| 4 | 0.5 | 0.12 | HBr | 0.62 | −20 | 1 | 0.5 | 0 | 0.12 |
| 5 | 0.5 | 0.12 | HBr | 0.62 | 0 | 1 | 0.5 | 0 | 0.12 |
| 6 | 0.5 | 0.12 | HBr | 6.2 | −20 | 4 | 0.5 | 0 | 0.12 |
| 7 | 0.5 | 0.12 | HCl | 0.62 | −80 | 1 | 0.5 | 0 | 0.12 |
| 8 | 0.5 | 0.12 | HCl | 0.62 | −50 | 1 | 0.5 | 0 | 0.12 |
| 9 | 0.5 | 0.12 | HCl | 0.62 | −30 | 1 | 0.5 | 0 | 0.12 |
| 10 | 0.5 | 0.12 | HCl | 0.62 | −20 | 4 | 0.5 | 0 | 0.12 |
| 11 | 0.5 | 0.12 | HCl | 6.2 | −20 | 1 | 0.5 | 0 | 0.12 |
| 12 | 0.5 | 0.12 | HCl | 3.1 | −20 | 4 | 0.5 | 0 | 0.12 |
| 13 | 0.5 | 0.12 | HCl | 3.1 | 0 | 8 | 0.35 | 0.15 | 0.12 |

*Example 2*

In each of a series of experiments, a charge of 236.5 grams of a divinylbenzene fraction consisting of 55 percent by weight of a mixture of 65 percent meta-divinylbenzene and 35 percent of para-divinylbenzene, 36 percent by weight of a mixture of 65 percent of meta-ethylvinylbenzene and 35 percent of para-ethylvinylbenzene and 9 percent by weight of a mixture of 65 percent meta-diethylbenzene and 35 percent para-diethylbenzene was placed in a glass reaction vessel equipped with a reflux condenser and stirer. The mixture was stirred and cooled to a temperature as stated in the following table while introducing hydrogen chloride or hydrogen bromide gas into the liquid in amount as stated in the table. After addition of the hydrogen halide the mixture was stirred for one hour longer, then the excess or unreacted hydrogen halide was removed by vaporizing it and removing the vapors. The residue was washed free from acid with water and was dried and analyzed. Table II identifies the experiments and gives the results obtained.

TABLE II

| Run No. | Starting materials | | | | Reaction conditions | | Product | | |
|---|---|---|---|---|---|---|---|---|---|
| | Divinyl-benzene, mol. | Ethyl vinyl benzene, mol. | Hydrogen halide | | Temp., °C. | Time, Hrs. | α-Haloethyl vinyl benzene, mol. | Di(α-halo-ethyl)-benzene, mol. | α-Haloethyl ethyl-benzene, mol. |
| | | | Kind | Mol. | | | | | |
| 1 | 1 | 0.65 | HBr | 1.65 | −80 | 1 | 1.0 | 0 | 0.65 |
| 2 | 1 | 0.65 | HBr | 7.25 | −80 | 4 | 1.0 | 0 | 0.65 |
| 3 | 1 | 0.65 | HBr | 16.5 | −80 | 8 | 1.0 | 0 | 0.65 |
| 4 | 1 | 0.65 | HBr | 1.65 | −50 | 1 | 1.0 | 0 | 0.65 |
| 5 | 1 | 0.65 | HBr | 7.25 | −50 | 4 | 1.0 | 0 | 0.65 |
| 6 | 1 | 0.65 | HBr | 16.5 | −50 | 8 | 1.0 | 0 | 0.65 |
| 7 | 1 | 0.65 | HBr | 1.65 | −20 | 1 | 1.0 | 0 | 0.65 |
| 8 | 1 | 0.65 | HBr | 7.25 | −20 | 4 | 1.0 | 0 | 0.65 |
| 9 | 1 | 0.65 | HBr | 16.5 | −20 | 8 | 1.0 | 0 | 0.65 |
| 10 | 1 | 0.65 | HBr | 16.5 | 0 | 8 | 0.65 | 0.35 | 0.65 |
| 11 | 1 | 0.65 | HCl | 7.25 | −20 | 4 | 1.0 | 0 | 0.65 |
| 12 | 1 | 0.65 | HCl | 16.5 | −20 | 4 | 1.0 | 0 | 0.65 |
| 13 | 1 | 0.65 | HCl | 16.5 | 0 | 8 | 0.7 | 0.3 | 0.65 |
| 14 | 1 | 0.65 | HCl | 1.65 | −80 | 1 | 1.0 | 0 | 0.65 |

We claim:

1. A method which comprises forming a mixture of isomeric alpha-haloethylvinylbenzenes by passing a hydrohalic acid selected from the group consisting of hydrogen chloride and hydrogen bromide into a liquid hydrocarbon material comprising meta- and para-divinylbenzenes while maintaining the mixture at reaction temperatures between −20° C. and −80° C.

2. A method which comprises forming a mixture of isomeric alpha-chloroethyl vinylbenzenes by passing hydrogen chloride into a liquid hydrocarbon material comprising meta- and para-divinylbenzenes while maintaining the mixture at reaction temperatures between −20° C. and −80° C.

3. A method which comprises forming a mixture of isomeric alpha-bromoethyl vinylbenzenes by passing hydrogen bromide into a liquid hydrocarbon material comprising meta- and para-divinylbenzenes while maintaining the mixture at reaction temperature between −20° and −80° C.

No references cited.